May 20, 1969

J. W. ROSS 3,445,365

ELECTRODE WITH ORGANIC LIQUID ION-EXCHANGER
RETAINED BY MEMBRANE

Filed Aug. 10, 1965

INVENTOR.
JAMES W. ROSS
BY
Robert J Schiller
ATTORNEY

United States Patent Office 3,445,365
Patented May 20, 1969

3,445,365
ELECTRODE WITH ORGANIC LIQUID ION-EXCHANGER RETAINED BY MEMBRANE
James W. Ross, Newton, Mass., assignor to Corning Glass Works, Corning, N.Y., a corporation of New York
Continuation-in-part of application Ser. No. 390,016, Aug. 17, 1964. This application Aug. 10, 1965, Ser. No. 478,583
Int. Cl. B01k 3/10, 3/02
U.S. Cl. 204—195                                7 Claims

ABSTRACT OF THE DISCLOSURE

In an electrode for determining the concentration of ionic species in an aqueous solution wherein the sensing portion is a liquid organic phase containing an organic ion exchange material capable of exchanging ions with the aqueous solution and the organic phase being substantially immiscible with the aqueous solution, the improvement being a porous membrane for supporting the organic phase in interfacial contact with the aqueous solution at the pores of the membrane, the membrane being a sheet of substantially homogeneous, electrically insulating material through which the pores extend substantially perpendicularly, the porosity of the membrane being less than about $1 \times 10^{-2}$, and the material being substantially chemically inert to both the organic phase and the aqueous solution.

---

This application is a continuation-in-part of application Ser. No. 390,016 filed Aug. 17, 1964.

The present invention relates to the measurement of the concentration of ionic species in solution, and more particularly to methods for determining the activity or concentration of ionic species and novel apparatus for use in such determination.

For the electrometric determination of ionic concentrations in solutions, a number of devices are known, and typically include a reference electrode and an ion-sensitive electrode which when simultaneously immersed into the same body of solution, constitute an electrochemical cell, across the electrodes of which a potential develops approximately proportionately to the logarithm of the activity or the concentration in the solution of ions to which one of the electrodes is sensitive. An electrometric device, usually either a direct reading circuit or a null-balance potentiometric circuit is employed for measuring the EMF between the electrode.

A large number of various ion-sensitive electrodes are known. For example, electrodes sensitive to hydrogen ions have variously been formed of such materials as iridium, antimony, quinhydrone, platinum-hydrogen, and most commonly, glass made of a number of various constituents. Glass electrodes sensitive to or responsive to other cations are also well known. For instance, glasses responsive to respectively sodium and potassium have been described in the patent literature. Significantly, such prior art electrodes are primarily sensitive to monovalent ions. It is believed that these glass electrodes function primarily by exchange of ions at the interface between the glass and the solution under test and not as the result of an electron exchange, i.e. a redox process.

It is further postulated that the electrode preference for monovalent ions arises, at least in part, because the electrode material is solid. The mobility particularly of polyvalent ions (i.e. ions having a valence change greater than unity) is limited in the solid, which is a substantially rigid lattice structure, even though the glass may include ion-exchange sites adequate both spatially and electrically to accept polyvalent ions. And while glass electrodes have met with considerable acceptance because of their relative insensitivity to either reducing or oxidizing agents in the test solution, the sensitivity thereof has been limited to cations and, indeed, it has been urged on theoretical grounds that such electrodes cannot exhibit anionic sensitivity.

The present invention contemplates as a principal object electrodes which comprise barrier means across which, responsively to an ionic species, it is intended to develop the requisite potential for electrometric determination of the ionic species, such barrier means comprising, in continuous phase, an ion-exchanger liquid.

Liquid ion-exchange, as the concept and variations of the phrase are used herein, is intended to refer to a liquid system that apparently operates by interchange of ions at an interface between a first liquid, for example, an aqueous solution, and a second liquid, such as an organic phase which is substantially immiscible with the first, there being negligible distribution of the first and the second liquid phases in one another. The interchange or ion-exchange is believed to depend upon an extraction process involving a metathetical reaction between the ions in the exemplary aqueous phase and ion-exchanger material in the solvent, which latter can be considered as the extractant phase. The extraction system of an ion-exchanger liquid, whether the latter is a liquid ion-exchanger per se or an organic solvent having ion-exchanger material dissolved therein, can be distinguished from other extraction systems such as extraction system by neutral reagents such as ethers, esters, phosphine oxide, and by solid ion-exchangers. The latter are readily distinguishable inasmuch as when used with aqueous solutions they are highly hydrated and generally exhibit low selectivities as exchangers when so hydrated. On the other hand, ion-exchanger liquids, as generally contemplated by the present invention, and liquid ion-exchangers specifically, are substantially anhydrous, and are fully operative in this condition.

The present invention further is intended to provide method and means for determining electrometrically the concentration of ions in solution, and involves as an essential part thereof the use of an ion-sensitive electrode in an electrometric cell having the following generalized formula:

Electrode (s); ion-exchanger (1)/solution under test/bridge; ref. electrode

As the solid electrode in electrical contact with the ion-exchanger liquid for forming the ion-sensitive electrode assembly, a number of known structures can be employed. However, it is preferred, out of consideration of the stability of contact potential, to use the well-known Ag-AgCl electrode. As the reference electrode and bridge, either a standard calomel type or Ag-AgCl type assembly is appropriate.

A large number of ion-exchange materials can be used, both of the anionic and cationic type. The ion-exchange material can be liquid per se under normal conditions. Among typical cation-exchangers of the liquid type are a number of normally liquid organophosphoric acids, such as di-2-ethylhexylphosphoric acid and either or both of the mono and di forms of n-butyl phosphoric acid and amyl phosphoric acid.

Certain carboxylic acids are known liquid cation-exchangers, such as, for example caproic acid and caprylic acid. Similarly, liquid cation-exchangers among the per-fluoro-carboxylic acids are typified by perfluorobutyric acid.

A number of liquid anion-exchangers are also known, particularly the primary, secondary and tertiary amines, typical examples of each of which are respectively N-trialkylmethylamine, N-lauryl-N-trialkylmethylamine, and N,N,N-tri-iso-octylamine.

In addition to those ion-exchangers which under normal conditions of temperature and pressure are liquid, other normally solid exchangers are useful in the present invention when dissolved in an appropriate liquid. For example, among the useful solid ion-exchangers are the known solid amines, quarternary ammonium salts, pyridinium salts, alkyl and aryl phosphates and phosphites, sulfonates and many others. Typical examples of such solid exchangers are dioctadecyl amine, tetraheptyl ammonium iodide, cetyl pyridinium chloride, nonadecylphosphoric acid, and dinonylnaphthalene sulfonic acid.

Yet other materials have been found to be useful as ion-exchangers for the electrodes of the invention and include a number of selected organometallic compounds such as trilauryl tin chloride, sodium tetraphenyl boron, dicyclo-pentadienyl zirconium dichloride, and the like dissolved in suitable solvents.

The exchanger materials preferred in one important aspect of the invention are characterized in possessing the property of being highly soluble (and thus, where applicable, highly miscible) in a first solvent, and substantially insoluble in a second solvent which is the solution under test in the generalized formula above. Typically, where the solution under test is aqueous, the exchanger material selected then possesses, as a part of the exchanger ion, an organic group or groups (alkyl, aryl, aralkyl or the like) of sufficient size (preferably a chain of six or more carbon atoms) or nature so as to provide a comparatively massive ion which is relatively soluble in an organic solvent but exhibits substantial insolubility in the aqueous solution.

The nature of the first solvent in which the exchanger (whether the latter is normally liquid or solid) is soluble is quite significant, and its liquidity provides ready formation of a continuous phase barrier or interface.

The selectivity of the ion-exchange material for a predetermined ion is believed to arise out of the nature of the sites in the exchanger which have a high affinity for that particular ion (i.e. the exchange constant of the exchanger) and also because that particular ion or the combination of ion and site has a relatively high mobility in the exchanger material. In an ion-exchanger in liquid form, whether liquid per se or by virtue of solution in a solvent, the mobility of the ion and ion site are considerably higher than will be found in the solid phase alone. The use of a solvent liquid with exchanger material provides several advantages over the direct use of a liquid ion-exchanger, alone and has functions other than merely solvent use with solid ion-exchangers. For example, by use of an appropriate mediator liquid, one can adjust the dielectric constant of the mixture thus formed, can adjust the mobility of the sites roughly in accordance with the viscosity of the mediator liquid, can adjust site density in accordance with the ratio of mediator liquid to ion-exchanger, and of course, the nature of the ion-sensitive site can be varied according to the type of ion-exchanger employed with a particular mediator liquid. The ion-exchange reaction can thus be mediated in accordance with the solvent or mediator liquid selected. The mediator liquid, whether functioning as a solvent for a normally solid ion-exchanger material, or as a diluent or mediator for an ion-exchanger liquid, preferably has a high enough dielectric constant, i.e. the volume resistivity of the ion-exchanger liquid will be sufficiently low, such that the impedance presented to an electrometric measuring device is not so high as to require elaborate shielding or ultra-high sensitivity devices of prohibitive cost.

The use of a mediator liquid having a relatively high dielectric constant requires that the liquid be chosen with considerable care, inasmuch as the characteristic of a high dielectric constant due to large dipole moments is frequently accompanied by the quality of comparatively good solubility in polar solvent, such as water. However, this is not always the case, and a number of mediators with appropriate properties are known. For example, some of the mediators suitable for use with ion-exchangers in the present invention are alcohols which preferably have long aliphatic chains in excess of eight carbon atoms, such as octyl and dodecyl alcohols; ketones such as 2-pentanone; aromatic compounds such as nitrobenzene and orthodichlorobenzene; trialkylphosphonates; and a mixture containing high molecular weight hydrocarbon aliphatic compounds, such as mineral oils, in phosphonates or the like. It also appears that despite the desirability of high dielectric constant for the mediator, the ion selectivity exhibited by the exchanger dissolved in the mediator is greater when the dielectric constant is low. Thus, the selection of mediator characteristics will often be a compromise.

The ion-sensitive electrode assembly of the present invention, as noted in the generalized formula above, essentially includes the first solid electrode and the ion-exchange liquid. The latter, basically forms means for providing a barrier presenting a surface for defining an interface with the solution under test, the surface being a substantially continuous phase of the ion-exchange liquid such that the ion-exchange reaction can occur at the interface. The first solid electrode, such as an Ag-AgCl electrode is in electrical contact with the body of the barrier means.

Where the electrode structure is such that the interface between the test solution and ion-exchanger liquid is substantially continuous and large relative to the volumes of both, certain problems arise. For example, extensive ion-exchange may create significant depletion layers on both sides of the interface. These layers can be broken up, as by stirring, to reduce errors (stirring artifacts) thus introduced into measurements made with such electrodes. Further, massive ion-exchange tends to contaminate the test solution. With respect to the ion-exchanger liquid, it will be appreciated that the potential between the exchanger liquid and the reference electrode in contact therewith should be substantially constant, at least over the time period during which measurements are made. This requirement cannot be met if the bulk phase of the exchanger liquid possesses ion concentration gradients due to massive migrations of ions exchanged from the test solution.

The present invention therefore contemplates provision of means for restricting ion transfer i.e. a bottleneck, in the form of a diffusing membrane between the test solution and the ion-exchanger liquid. The membrane is preferably a substantially homogenous sheet which reduces the diffusion coefficient of ionic species between the two bulk phases. Because ordinary membranes, e.g. cellophane or the like, often tend to slow response time, the membrane includes channels of finite size filled with liquid exchanger material so that the diffusion coefficient through the channels remains high but the average ion flux through the membrane is considerably less than would occur at a continuous exchanger-test solution interface of the same area as the membrane surface.

The terms "liquid," "solid," "immiscible," and the like, which are used herein with reference to physical properties of materials, are to be understood as referring to such properties as they exist under substantially normal conditions, such as room temperatures and atmospheric pressures. For example, the term "solid" then refers to a state wherein, under the foregoing normal conditions, the elements of a matrix or lattice structure exhibit spatial orientation which is substantially static or fixed over ordinary time periods during which the property of solidity is significant or required.

Other objects of the invention will in part be obvious and will in part appear hereinafter. The invention accordingly comprises the apparatus possessing the features, properties and relation of elements which are exemplified in the following detailed disclosure and the scope of the application of which will be indicated in the claims.

For a fuller understanding of the nature and objects of the present invention, reference should be had to the following detailed description taken in connection with the accompanying drawings wherein.

Figures 1, 2:
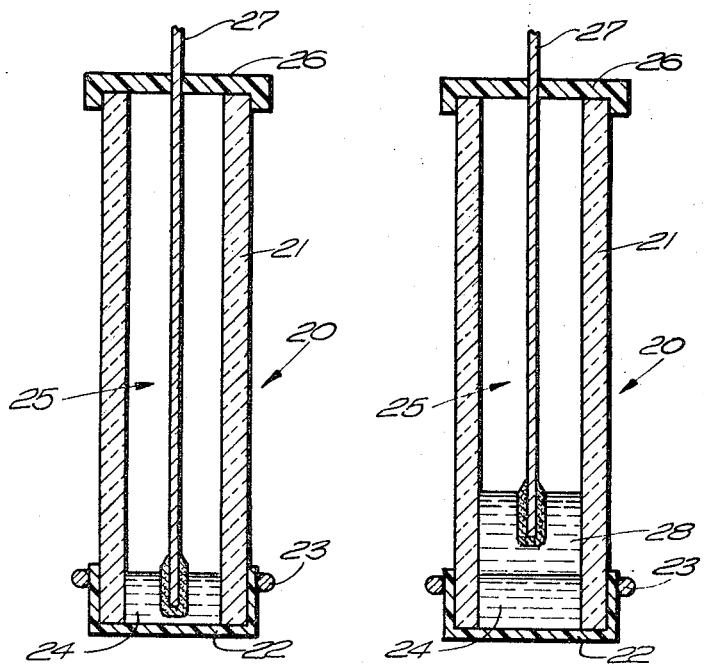
FIG. 1 is a diagrammatic cross-sectional representation of an exemplary electrode formed according to the principles of the present invention.
FIG. 2 is a cross-sectional, diagrammatic representation of another embodiment of an electrode formed according to the principles of the present invention.
Figure 4:
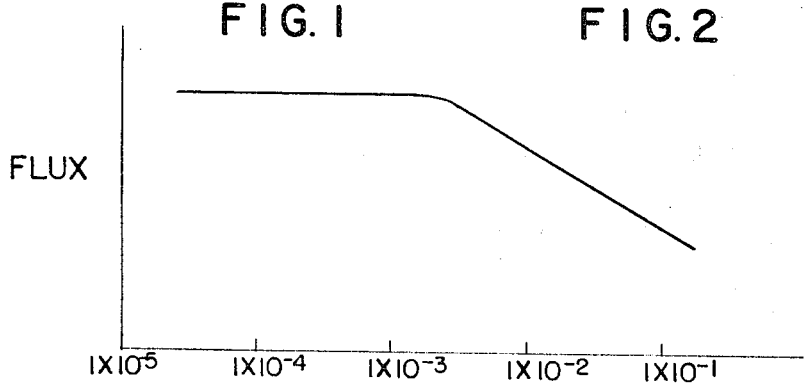

FIG. 4 is a graphical representation showing the relation of ion flux through a membrance of the present invention to the relative porosity of the membrane; and Referring now to the drawings, there will be seen in FIG. 1 a specific embodiment of ion-sensitive electrode 20 of the present invention and comprising electrically insulating container means such as glass tube 21 having an opening at each end thereof. One end of tube 21 is tightly capped with a substantially chemically inert, thin (e.g., 10 microns), porous web or diffusing membrane 22 held in place by suitable means such as O-ring 23. Disposed interiorly of tube 21 and in contact with membrane 22 and filling the pores of the membrane is a continuous body of ion-exchanger liquid 24 which may be either a liquid ion-exchanger per se or a normally solid ion-exchanger dissolved in a suitable solvent mediator or a normally liquid ion-exchanger diluted or attenuated with an appropriate mediator. Immersed directly in ion-exchange liquid 24 is electrode means 25, the portion thereof contacting the liquid 24 preferably being a reference electrode formed of a material such as a silver-silver chloride mass which ordinarily provides a stable junction potential. The end of tube 21 opposite membrane 22 may be capped by lid 26 which acts both as a closure and as a support for electrically conductive lead 27 which forms a portion of electrode means 25.

The electrode of FIG. 1 is employed by contacting the outer surface of membrane 22 with the test solution. Membrane 22 provides a mechanical support which retains liquid 24 within tube 21, while also permitting the formation of the effective ion-exchanging, liquid-liquid interface between the ion-exchanger liquid and the test solution.

The ion-sensitive electrodes thus described, when in use, should be electrically shielded, as by surrounding it with a grounded, electrically conductive mass or the like, as is well known in the art. Additionally, it has been described as including an electrically conductive lead physically contacting the exchanger material. This lead can be an Ag—AgCl electrode even though the exchanger material has neither silver nor chloride ions to set up the equilibrium with the electrode postulated by theory. Direct physical contact of an electrode or lead with the exchanger is not necessary either. Electrical contact can be maintained as shown in FIG. 2 (which is a variation of the embodiment of FIG. 1) simply by providing electrolytic solution 28 such as a standard 0.1 N HCl internally of tube 21 so disposed as to sandwich liquid 24 between solution 28 and membrane 22. The Ag—AgCl form of electrode 25 then is in physical contact only with the electrolytic solution and at a substantially fixed contact potential with respect to the latter.

Figure 3:
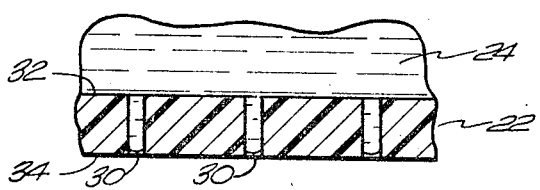
FIG. 3 is an enlarged cross-sectional view of a fragment of the membrane employed in the embodiments of FIGS. 1 and 2.

As shown particularly in FIG. 3, the pores of membrane 22 should be impregnated thoroughly with liquid ion-exchange material 24. This can be accomplished by vacuum treating the membrane to evacuate the pores, immersing the membrane in ion-exchanger liquid, and then returning the membrane to atmospheric pressure while so immersed. No additional ion-exchanger liquid is then necessary, electrical contact between internal reference electrode 25 and the membrane 22, for example, being accomplished with an ion-containing solution 28 such as is shown in FIG. 2.

It is desirable that an electrode in operation exhibit negligible stirring error, negligible contamination of both liquid phases, fast equilibration and a low enough electrical impedance to allow accurate measurement of potentials developed. To these ends, membrane 22 is formed as a sheet of substantially homogenous, chemically inert (to both liquid phases), electrically insulating material having a number of channels or pores 30 of finite size extending from openings on opposite surfaces 32 and 34 of and through the sheet, as shown in FIG. 3.

A number of parameters of this membrane are quite important. In order to achieve rapid equilibration, the channels or pores in the membrane provide minimal distance, ion-transfer paths, i.e., are substantially as short as possible (e.g., extend perpendicularly to the membrane surfaces) and each is straight (i.e., not torturous), characteristically having substantially uniform cross-section (i.e., does not include substantially enlarged volumes within the bulk of the membrane). The thinner the membrane, the shorter the holes will be and, correspondingly, the more quickly can equilibrium be reached. The practical lower limit on membrane thickness is governed by manufacturing difficulties and the mechanical strength desired. For example, membranes as thin as 7 to 10 microns have been used and the preferred thickness is in this range.

The membrane porosity is highly important. Porosity, as the term is used herein, is intended to indicate a dimensionless valve which is the ratio of the sum of the areas of all of the pore openings (i.e., the "open" area) in a membrane surface to the total area of that surface (i.e., both the "closed" and "open" areas). For example, if a surface of 1 square centimeter is perforated with substantially uniformly distributed holes of substantially similar dimensions having a summed total "open" area of 0.001 cm., then its porosity would be $1 \times 10^{-3}$.

For a given membrane, many small (in cross-sectional area) holes are preferable to a few large holes although the membrane porosities may be identical. Many small holes constitute a large number of chemically conductive paths in parallel, so the total resistivity across the membrane is thus lower than that exhibited by a lesser number of holes in a membrane of the same total porosity. The desired number of holes and the porosity of a given membrane can be determined substantially as follows:

Within the bulk phase of the exchanger liquid, as has been noted, it is important from the standpoint of desirable electrical behavior that no ion concentration gradients exist, i.e., that the exchanger liquid can be considered infinitely stirred. Thus, the potential of interest developed across the membrane can be accurately ascertained. This potential is believed to be the sum of two voltages: the Donnon ion-exchange equilibrium voltage at the interface between the two liquid phases, in series with a potential due to the concentration gradient in the ion-exchanger liquid in the pores, i.e., the diffusion potential. The latter is not dependent on the membrane which preferably has a very small electrical conductance, but on the nature of the ion-exchange liquid which has a comparatively high conductivity.

To minimize concentration gradients in the bulk phase of the exchanger liquid (the liquid outside the membrane) or conversely to restrict concentration gradients to the exchanger liquid within the membrane, it has now been unexpectedly found that for a membrane of given thickness there is an optimum maximum porosity. If one plots, as shown in FIG. 4, the porosity of membranes against a diffusion flux (e.g., the number of ions exchanged per unit time per "open" area of a membrane) through a surface of that membrane, the relation, as the porosities decrease down to between $1 \times 10^{-2}$ to $1 \times 10^{-3}$, is a line of constant slope indicating that the flux increases dependently on the porosity. However, at porosities less than the aforesaid value between $1\times10^{-2}$ and $1\times10^{-3}$, the flux becomes independent of porosity and remains substantially constant even though the porosity decreases considerably below this value. It is thus apparent that the desired limitation of diffusion potential substantially to within the membrane can be achieved by using membranes of porosity less than about $1\times10^{-2}$. This effect is believed to be independent of the nature of the ion, provided, of course, that the pore size is greater than would interfere with ion mobility.

For a given membrane area, the preferred average hole size can be derived from the foregoing. For example, for a 1 cm. square membrane, it is apparent that the average hole size will be the ratio of a preferred porosity (e.g., $1\times10^{-2}$) to the number of holes, this latter number being established largely in view of the acceptable maximum input impedance of the potentiometric device being used to measure the diffusion potential. Obviously, one hole could be used (e.g., a hole of 0.01 cm.$^2$ cross-section in a 1 square centimeter membrane), but the total resistivity across the membrane would be very high. To reduce the resistivity to a practicable level, it is desired to use enough holes to bring the total electrode resistance below about 1000 megohms. Thus, the number of holes can be readily computed from the volume resistivity of the exchanger employed. Of course, these volume resistivities differ considerably, as by an order of magnitude or more.

In the preferred membrane, hole sizes (i.e., cross-sectional area) are substantially uniform, the majority of holes being of the same size well within at least a factor of 2. While the distribution of holes across the membrane surface need not be ordered, it should be of relatively uniform density. Membranes meeting these criteria typically are formed from sheets of polymers, such as "Lexan" (a trademark for a material believed to be a thermoplastic carbonate-linked polymer produced by the reaction of bisphenol-A and phosgene) which are believed to have been exposed to controlled dosage of ionizing radiation (such as particles) to create perforating damages to the molecular lattice structure, the damaged portions then being etched through by an agent such as a fluorinated hydrocarbon.

Similarly, crystalline materials such as thin sheets of mica are useful and are believed to be formed into such membranes by exposure to perforating-damaging radiation, and etching with hydrofluoric acid. Mica sheets having substantially uniform distribution of pore of about 50 A. diameter at a porosity of about 1% are readily obtainable and are useful as membranes in electrodes formed according to the principles of the present invention.

The following example is illustrative of the use of membranes of the type embodying the principles of the present invention in ion-sensitive electrodes:

EXAMPLE I

A 10% solution of dicyclopentadienyl zirconium dichloride was formed in decanol and about 0.1 ml. of dioctyl phenyl phosphonate added per gram of solution. An electrode was formed by placing this solution in a glass tube and covering one end of the tube with a "Lexan" membrane of about 7–10M thickness. The membrane had about $1\times10^{-5}$ pores per square centimeter formed therethrough, the pores having approximately $1\mu$ diameter and extending substantially straight through the membrane. A silver-silver chloride reference wire was placed in contact with the solution.

This electrode assembly was employed in the usual manner in conjunction with a standard calomel reference electrode to form a measuring circuit, the calomel electrode and the other surface of the membrane being simultaneously exposed to contact the solution under test. The potential difference between the exchanger and calomel electrode was measured with a high input impedance ($>10^{14}\Omega$) voltmeter. When tested in a number of solutions, each differing from the others either in the nature of the anion present or the concentration of the latter. The following results were observed.

| Ion | Concentration, molar | Reading in mv |
|---|---|---|
| I$^-$ | 0.001 | +22 |
| I$^-$ | 0.01 | −20 |
| I$^-$ | 0.1 | −59 |
| F$^-$ | 0.01 | −39 |
| Cl$^-$ | 0.01 | +42 |
| HCO$_3^-$ | 0.01 | −49 |
| HCO$_3^-$ | 0.1 | −126 |

The electrode thus exhibited preferential response, for example, to bicarbonate ions. Each reading, using a clean electrode, reached a substantial equilibrium level in less than one minute.

EXAMPLE II

A solution of bis-decyl calcium phosphate in dioctyl phenyl phosphonate in 1:10 proportions was used in place of the 10% solution of dicyclopentadienyl zirconium chloride of Example I to form an electrode.

When tested for response time against solutions of varying concentration, the following results were obtained:

| Ion | Concentration, molar, Ca | Reading in mv. | Average equilibration time (sec.) |
|---|---|---|---|
| Ca$^{++}$ | 0.001 | −122 | 30 |
| Ca$^{++}$ | 0.01 | −98 | 30 |
| Ca$^{++}$ | 0.1 | −74 | 30 |

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. An electrode assembly sensitive to ions in an aqueous solution comprising, in combination,
    a body of an organic ion-exchanger liquid substantially immiscible with said solution;
    an electrically conductive reference electrode for providing electrical contact with said liquid at a substantially fixed contact potential; and
    a porous membrane, pervious to said liquid, for supporting said liquid in interfacial contact with said solution at the pores of said membrane, said membrane being a sheet of substantially homogeneous, electrically insulating material through which said pores extend substantially perpendicularly, the porosity of said membrane being less than about $1\times10^{-2}$, said material being substantially chemically inert to both said liquid and said solution.

2. An electrode assembly as defined in claim 1 wherein said membrane material is a synthetic polymeric sheet.

3. An electrode assembly as defined in claim 2 wherein said material is a thermoplastic carbonate-linked polymer.

4. An electrode assembly as defined in claim 1 wherein said membrane material is crystalline.

5. An electrode assembly as defined in claim 4 wherein said material is mica.

6. An electrode assembly sensitive to ions in an aqueous solution comprising, in combination,
    a hollow container of electrically insulating material and having at least one opening therein;
    a membrane of electrically insulating material disposed in covering relation across said opening and having a plurality of pores therethrough, substantially all of said pores extending substantially perpendicularly through said membrane so as to provide minimal distance paths of substantially constant cross-section between opposed surfaces of said membrane;

an organic ion-exchanger liquid disposed at least within said pores, said liquid being substantially immiscible with said solution; and a reference electrode positioned in said container in electrical contact with said liquid.

7. An electrode assembly as defined in claim 6 wherein the porosity of said membrane is less than $1 \times 10^{-2}$ and said pores are present in number sufficient to maintain the total electrical resistance through said pores to said reference electrode below about 1000 megohms.

References Cited
UNITED STATES PATENTS 2,913,386  11/1959  Clark _____ 204—195

OTHER REFERENCES

"Journal of the Am. Chem. Soc.," vol. 86, May 5, 1964, pp. 1901–1902.

Lewis et al.: "Journal of the Electrochemical Soc.," vol. 106, No. 4, April 1959, pp. 347–354.

HOWARD S. WILLIAMS, *Primary Examiner*.

T. TUNG, *Assistant Examiner*.

U.S. Cl. X.R.

204—295, 296